United States Patent [19]

Mayfield et al.

[11] Patent Number: 4,603,887
[45] Date of Patent: Aug. 5, 1986

[54] RIGID ADJUSTABLE LENGTH ASSEMBLY

[75] Inventors: Terry D. Mayfield; William D. Kendrick, both of Duncan, Okla.

[73] Assignee: Halliburton Company, Duncan, Okla.

[21] Appl. No.: 656,396

[22] Filed: Oct. 1, 1984

[51] Int. Cl.$^4$ .............................................. F16L 27/12
[52] U.S. Cl. ....................................... 285/32; 285/298; 285/165; 285/302; 285/367; 285/373; 285/410; 403/118; 403/344
[58] Field of Search .................... 285/32, 18, 298, 165, 285/301, 302, 419, 373, 367, 410, 112; 24/20 EE, 274 WB, 275, 278, 279; 403/342, 118, 299, 344

[56] References Cited

U.S. PATENT DOCUMENTS 2,078,192  4/1937  Buhr et al. ........................ 403/118
2,968,440  1/1961  Cone ................................. 285/302
4,311,248  1/1982  Westerlund et al. .............. 285/112

Primary Examiner—Cornelius J. Husar
Assistant Examiner—Douglas W. Hanson
Attorney, Agent, or Firm—James R. Duzan; E. Harrison Gilbert, III

[57] ABSTRACT

A fluid flow system comprises a plurality of operational elements which are interconnected by rigid conduits. The present invention provides a rigid interconnecting conduit which includes a statically adjustable assembly comprising two telescopically associated members having a combined length which is variable to accommodate objects spaced at different distances and orientations. The assembly also includes a member for clamping the relatively movable elements to provide a rigid linkage once the interconnection of the objects is made.

13 Claims, 13 Drawing Figures

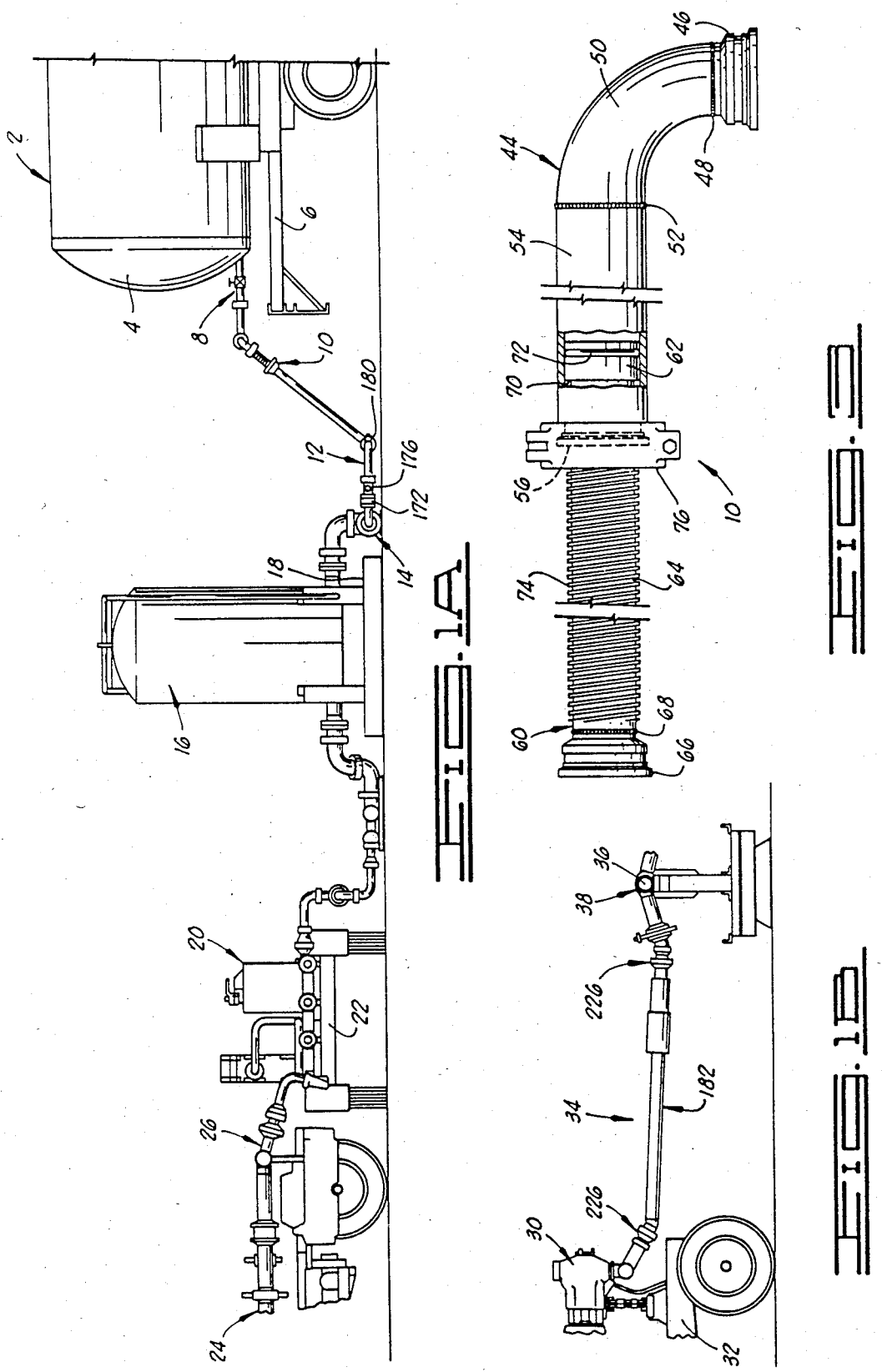

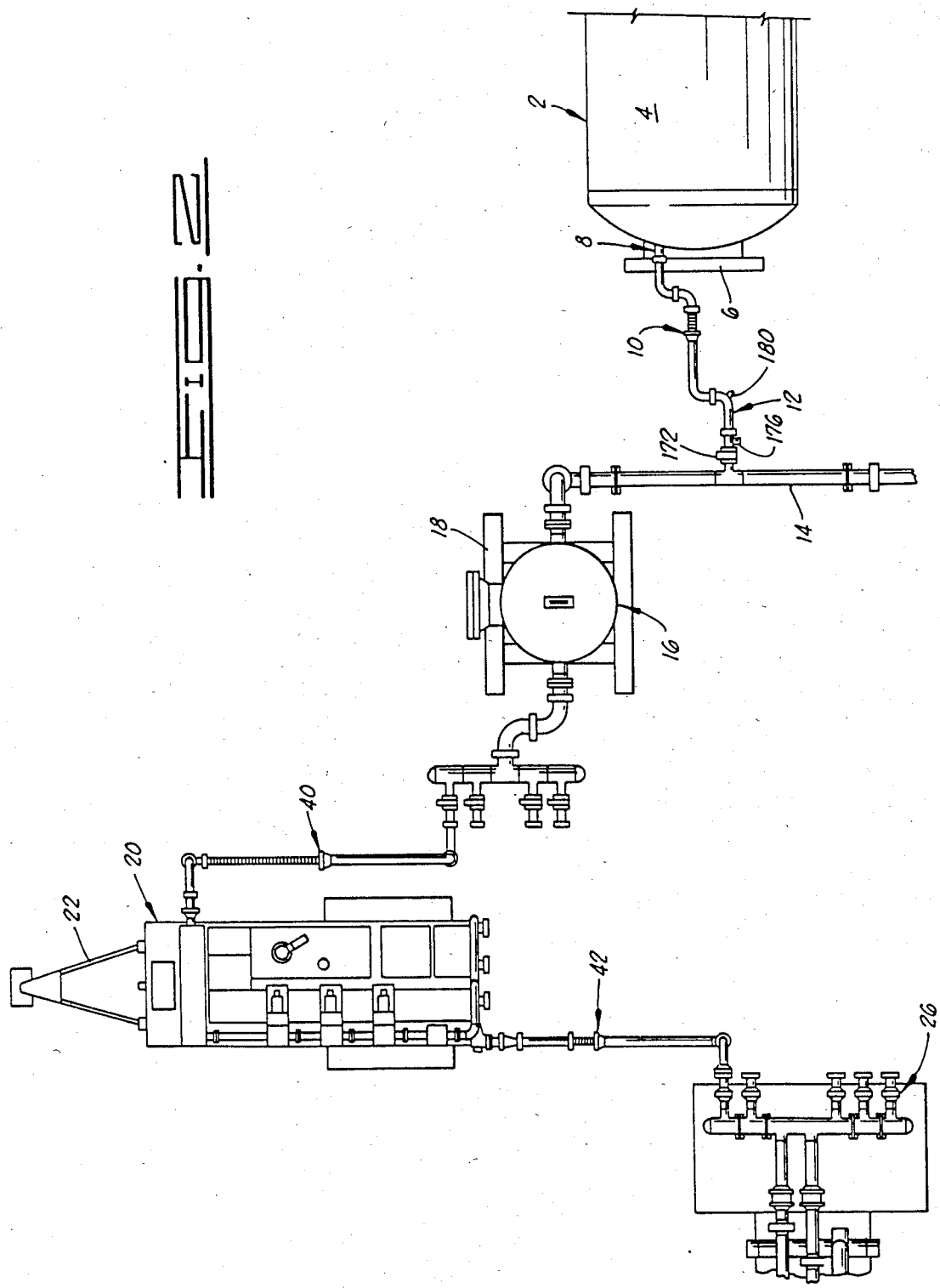

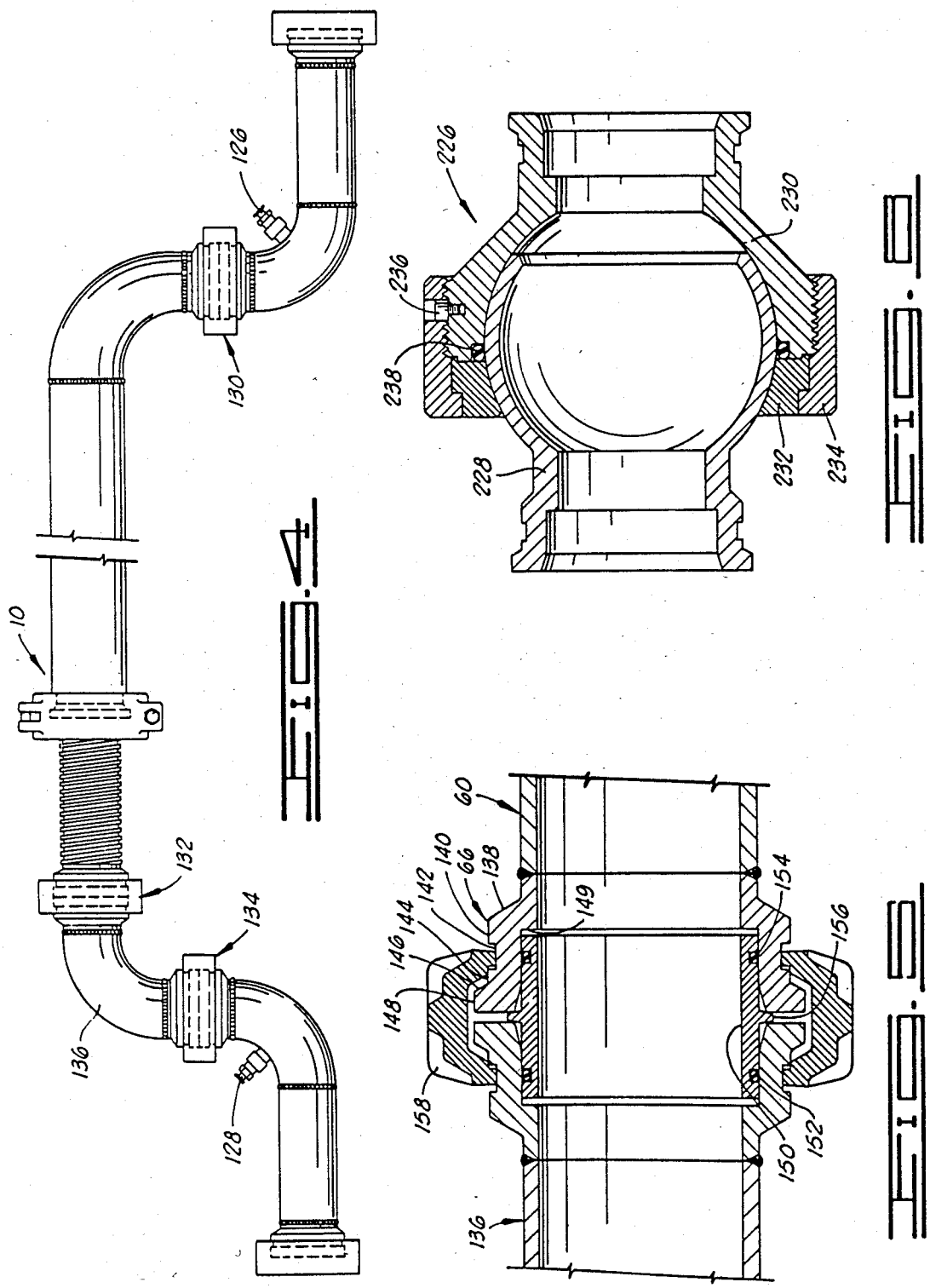

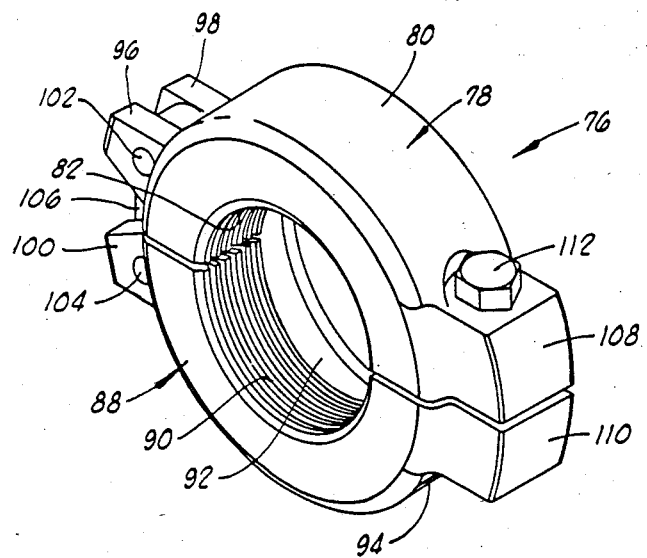
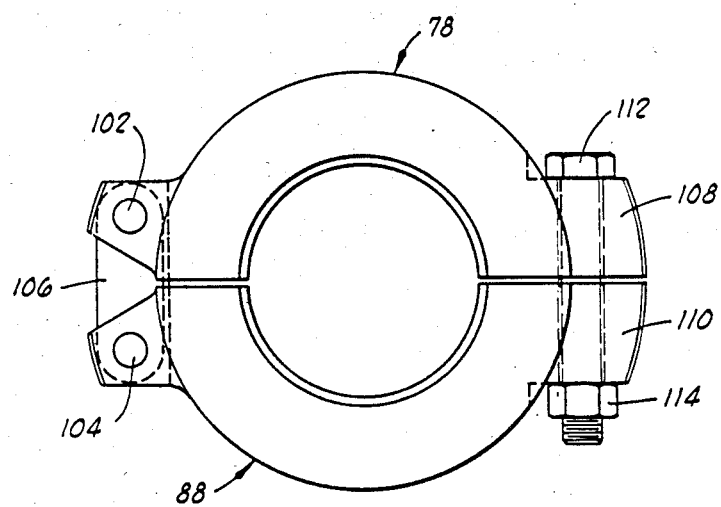
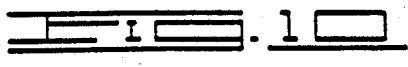

RIGID ADJUSTABLE LENGTH ASSEMBLY

BACKGROUND OF THE INVENTION

This invention relates generally to rigid adjustable length assemblies and more particularly, but not by way of limitation, to a rigid adjustable length manifold assembly for rigidly connecting two objects of a fluid-delivery system, which objects can be spaced at different distances and orientations relative to each other at a well site.

At a well site where an oil or gas well has been drilled, for example, there is often the need for injecting a fracturing fluid into the well and the surrounding formation to enhance the flowability of the formation. One specific substance which is used as a fracturing fluid is liquid carbon dioxide contained at the well site in large storage receivers which can hold, for example, fifty to sixty tons of liquid carbon dioxide per receiver. Several of these receivers can be located at a well site, and we are aware of at least one location where up to fifty-eight of such fifty to sixty ton receivers have been used.

From these receivers, the carbon dioxide is pumped at a temperature of between $+20°$ F. and $-20°$ F. and at a pressure of up to approximately 500 pounds per square inch (psi). If a break should occur in such a system, the liquid carbon dioxide escapes into atmospheric conditions and rapidly changes state to vapor and solids.

Obviously, there is the need for some type of safe system for conveying such a substance as the liquid carbon dioxide from the receivers to the well. Present systems of which we are aware use flexible hoses often connected in series between each of the receivers with wing nuts or the like. We are aware of occurrences where either the wing nuts have failed or the flexible hoses have ruptured, thereby allowing the liquid carbon dioxide to spew out and rapidly form a blinding vapor cloud. The vapor cloud impedes shutting down the broken portion or the overall system. In those instances where the hoses are connected in series, the entire system must be shut down even though only a small part may have been ruptured or broken; additionally, the flowability of the sysem is limited to the capacity of the serially connected hoses. Furthermore, when flexible hoses are used, the result is often an intertwined mass of hoses which hampers both shutdown and detection of the specific ruptured or broken portion.

Although flexible hoses may present certain problems in a fluid delivery system of this type, they do permit easy coupling of the parts within the system which are at variable distances from each other. Additionally, flexible hoses compensate or allow for relative movement between the coupled parts, such as between an operating pump and a stationary conduit supplying the fluid to the pump.

Therefore, there is the need for a fluid delivery system which has parallel-connected rigid interconnections for properly conveying fluid and for relatively rapidly and easily permitting controlled shutoffs should a portion of the system be damaged. Furthermore, there is the need for such a system with rigid interconnections to provide, despite the rigidity of the individual elements, for compensating between differences in distances and orientations between different equipment or parts of the system and for compensating for relative motion between parts of the system while the fluid is flowing therethrough.

SUMMARY OF THE INVENTION

The present invention provides a system which meets the aforementioned needs. The present invention includes structural elements which provide sturdy rigid connections not achieved by the previously used types of flexible hose. Many of these rigid connections are made in parallel to a relatively large flow capacity common gathering manifold to allow for independent shut-off of specific parts of the system without shutting down the operation of the overall system and to allow for better flowability than can be obtained within serially connected flexible hose systems. Although interconnections are made by rigid elements, certain inventive elements are utilized so that different heights and distances can be accommodated under static conditions (i.e., where there is no relative motion between parts of the system), while other inventive elements permit spatial adjustments under dynamic conditions (i.e., where there is relative motion between parts of the system).

The overall system broadly comprises an adjustable length manifold assembly for providing an adjustable linkage between a fluid source and a fluid outlet and dynamic coupling means for providing a linkage which is automatically adjustable during fluid flow between the source and the fluid outlet. The system of the present invention contemplated to be used in a liquid carbon dioxide delivery system used at a well site also includes a gathering manifold which is connected between the adjustable length manifold assembly and a vapor separator unit. The vapor separator unit is connected to a pressure booster unit which is connected to a distribution manifold, both of which are also included within this specific system. The distribution manifold is connected to a pump by the dynamic coupling means.

The adjustable length manifold assembly broadly includes two rigid conduit members. One of the conduit members has an end in which the other rigid conduit member is telescopically associated. The inner rigid conduit member has an external surface with a continuous thread. The relative positions between the two rigid conduit members are established and maintained by a rotatable collar member having a threaded interior surface which engages the thread of the inner rigid conduit member. The rotatable collar member also has a clamp portion for retaining the rotatable collar member stationary relative to the outer rigid conduit member.

The dynamic coupling means broadly includes a longitudinal adjustment means for permitting longitudinal movement in the system while maintaining a pressure balance between the associated components of the system when the system is pressurized and/or when fluid is flowing through the system. The dynamic coupling means also broadly includes a transverse adjustment means for permitting transverse movement in the system when fluid is flowing therethrough. The longitudinal adjustment means broadly includes a rigid housing having an interior wall defining a fluid passageway and having an exterior wall associated with the interior wall so that a cavity is defined between the two. The longitudinal adjustment means also includes a rigid piston member having a piston head portion slidingly disposed in the cavity for longitudinal movement in response to relative longitudinal movement between two parts of the system connected by the longitudinal adjustment means. The transverse adjustment means broadly includes ball joint means for permitting movement in the system transverse to the longitudinal movement of the rigid piston member.

Therefore, from the foregoing, it is a general object of the present invention to provide a novel and improved rigid adjustment length assembly. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIGS. 1A–1B show an elevational view of the preferred embodiment system of the present invention.

FIG. 2 is a top plan view of the portion of the system shown in FIG. 1A.

FIG. 3 is a view, shown partially in section, of the preferred embodiment adjustable length manifold assembly of the present invention.

FIG. 4 is a view of the adjustable length manifold assembly of FIG. 3 connected at its ends to other conduits.

FIG. 5 is a sectional view of a preferred embodiment coupling mechanism used in the preferred embodiment system of the present invention.

FIG. 8 is a sectional view of the preferred embodiment transverse adjustment means of the present invention.

FIG. 9 is an isometric view of the preferred embodiment connector collar of the adjustable length manifold assembly shown in FIG. 3.

FIG. 10 is a side view of the collar shown in FIG. 9.

DETAILED DESCRIPTION OF THE PREFERRED EMBODIMENT

Figure 6:
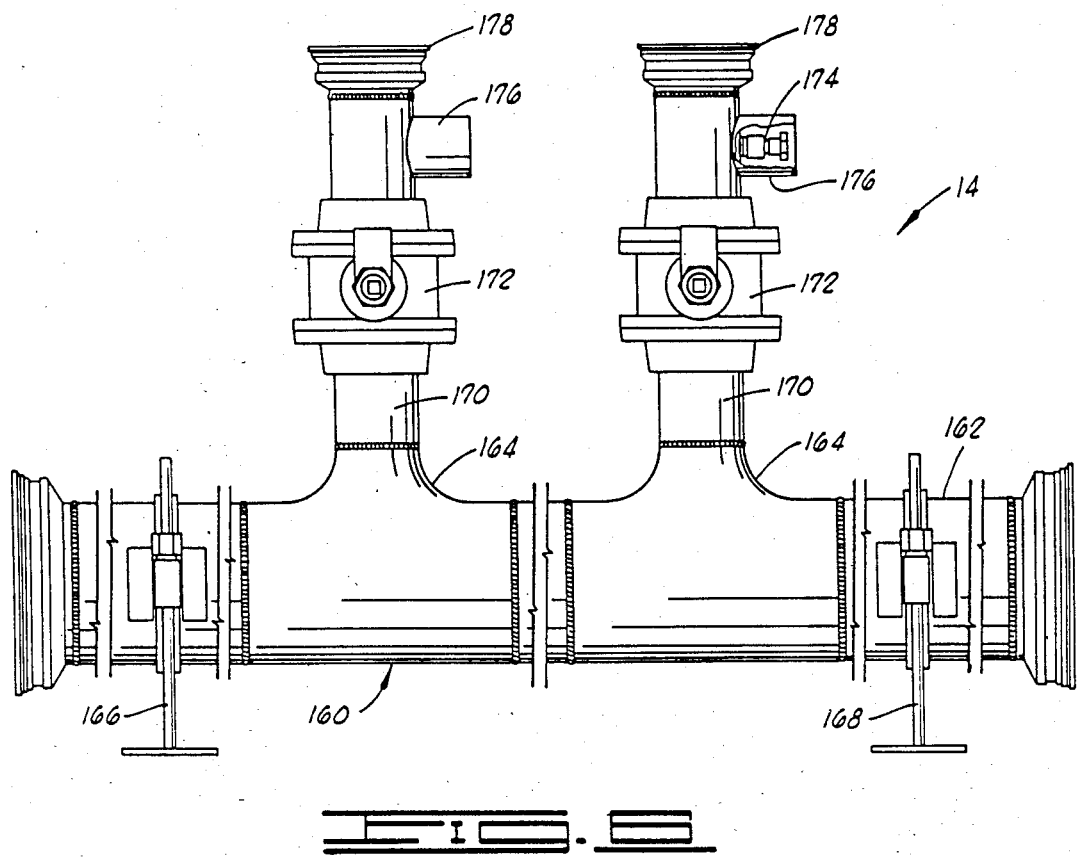
FIG. 6 is a view of a portion of the preferred embodiment gathering manifold of the present invention.

Referring to FIGS. 1A-2, the preferred embodiment of the system of the present invention will be described. The environment in which the illustrated preferred embodiment is contemplated to be used includes that found at a well site where liquid carbon dioxide is to be pumped into a well (not shown) for fracturing the formation in which the well has been drilled. The liquid carbon dioxide is contained in a receiver 2 which includes a tank 4 mounted on a wheeled trailer 6. The tank 4 has an inlet (not shown) into which the liquid carbon dioxide can be flowed from a transport tanker (not shown) of a type as known to the art. The tank 4 of the preferred embodiment has a capacity of up to approximately fifty to sixty tons. The liquid carbon dioxide flows from the tank 4 through an outlet 8 having a valve associated therewith as schematically shown in FIG. 1A. At an actual well site, there can be more than one receiver 2 depending upon the quantity of fracturing fluid needed for treating the well. In general, the receiver 2 is of a type as known to the art.

Connected to the outlet 8 of the receiver 2 is an adjustable link assembly 10 constructed in accordance with the present invention. The adjustable link assembly 10 will be more particularly described hereinbelow.

Connected to the adjustable length manifold assembly 10 by suitable intermediate rigid piping 12 is a gathering manifold 14. The gathering manifold 14 will also be more particularly described hereinbelow.

It is to be noted that the adjustable link assembly 10 provides a rigid connection between the receiver 2 and the gathering manifold 14 during dynamic conditions when fluid is flowing through the system. However, during static conditions when no fluid is flowing, the adjustable length manifold assembly is adjustble to accommodate for different distances and orientations between the various outlets 8 and inlets of the gathering manifold 14 in a multiple receiver system.

The outlet of the gathering manifold 14 is connected by suitable rigid piping to the inlet of a liquid-vapor separator unit 16. In the illustrated preferred embodiment, the liquid-vapor separator unit 16 is mounted on a suitable skid 18. The construction and operation of the separator unit 16 are of types as known to the art.

The outlet of the vapor separator unit 16 is connected by suitable rigid piping to a pressure booster unit 20 mounted on a wheeled trailer 22. The pressure booster unit 20 is of a type as known to the art.

The outlet of the pressure booster unit through which the more highly pressurized fluid flows is connected to a distribution manifold 24 of a type as also known to the art. Only a portion of the distribution manifold 24 is shown in FIGS. 1A and 2; however, these depictions show that the preferred embodiment includes a bank of five inlet ports, identified by the reference numeral 26 and a plurality of outlet ports.

The outlets of the distribution manifold 24 are connectible to pumps, one of which is shown in FIG. 1B as identified by the reference numeral 30. In the illustrated preferred embodiment, the pump 30 is a Halliburton HT-400 pump mounted on a suitable wheeled trailer or vehicle 32.

The pump 30 is connected to the distribution manifold 24 by means of a dynamic coupling means 34 shown in FIG. 1B. The connection to the distribution manifold is made at the structure 38 having the fluid passageway 36 (FIG. 1B) for receiving flow in the distribution manifold from the inlet ports 26, for example. The dynamic coupling means 34 accommodates relative motion between the pump 30 and the distribution manifold 24 when the pump 30 is operating. Thus, the element 34 of the system of the present invention provides for dynamic coupling during fluid flow as differentiated from the static coupling of the adjustable length manifold assembly 10.

Although not shown, extending from the outlet of the pump 30 is a suitable conduit for conveying the fracturing fluid to a tubing running into the well to the point at which the fluid is to be injected into the downhole formation.

FIG. 2 shows that the rigid piping interconnecting the vapor separator unit 16 and the pressure booster unit 20 and interconnecting the pressure unit 20 with the distribution manifold 24 also include adjustable length manifold assemblies which are respectively identified by the reference numerals 40, 42.

Referring to FIGS. 3 and 9–12, the adjustable length manifold assembly 10 will be described. The adjustable length manifold assembly 10 includes a rigid outer body 44 made of a suitable conduit such as a curved section of pipe made of suitable material, such as steel. The outer body 44 depicted in FIG. 3 has three segments. The first is an end segment 46 having a hub, the construction of which will be subsequently described, for connecting with either the outlet 8 of the receiver 2 or the piping 12. The end section 46 is welded along a seam 48 to an elbow segment 50 of pipe. The elbow segment 50 is welded along a seam 52 to a straight end segment 54 of pipe.

The side wall provided by the various pipe segments of the outer body 44 defines a hollow interior region which is cylindrical in view of the cylindrical nature of the illustrated preferred embodiment pipe segments. The hollow interior region has an inner diameter of a suitable length.

The straight segment 54 terminates in an end having a circumferential lip 56 in which a circumferential groove 58 is defined. This construction is more clearly depicted in FIG. 12 and is not shown in FIG. 3 for purposes of simplicity of the drawing in FIG. 3. The circumferential lip 56 extends radially around the mouth of the segment 54.

Passing through the mouth of the segment 54 and telescopically received within the hollow interior region of the rigid outer body 54 is a rigid inner body 60. In the preferred embodiment the inner body 60 is a suitable conduit such as one made of straight pipe having an end portion 62, a central body portion 64 and another end portion 66 which is shown in FIG. 3 to be welded to the portion 64 along a weld seam 68. The rigid inner body 60 has an outer diameter which is less than the inner diameter of the outer body 44 so that the inner body 60 can readily slide along the length of the straight segment 54 of the outer body 44. The inner body 60 has a hollow interior region defined by the side wall made up of the sections 62, 64 and 66. The hollow interior region of the inner body 60 is in fluid communication with the hollow interior region of the outer body 44.

The end section 62 has a flanged rim construction having an annular edge 70 facing the central body portion 64 and extending radially from the central portion 64. A seal ring 72 is mounted on the end section 62 for providing a fluid-tight seal between the inner body 60 and the outer body 44.

The central portion 64 of the inner body 60 has a cylindrical outer or exterior surface with a continuous thread 74 defined along a major portion thereof.

The end portion 66 comprises a hub of a type similar to the hub of the section 46 of the outer body 44.

Figure 11:
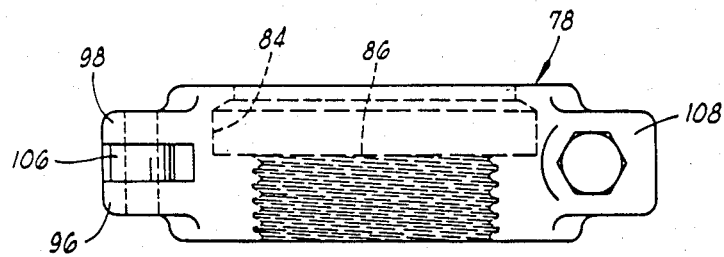
FIG. 11 is an edge view of the collar shown in FIG. 9.
Figure 12:
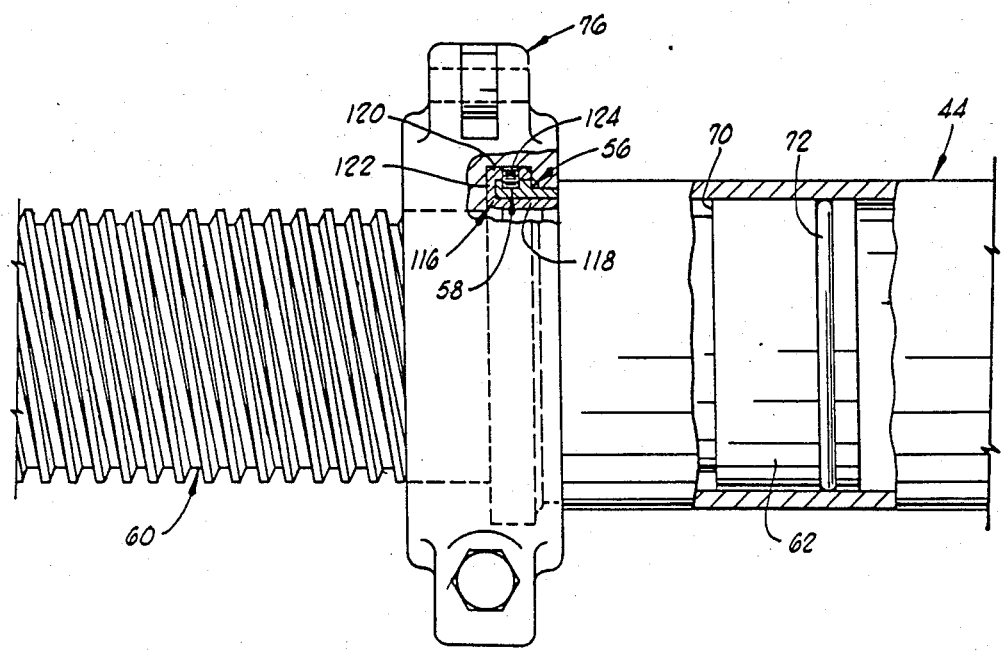
FIG. 12 is an enlarged view, partially in section, of a portion of the adjustable length manifold assembly shown in FIG. 3.

The outer body 44 and the inner body 60 are adjustably related and fixedly secured to each other by a connector mechanism 76 generally shown in FIG. 3, but more particularly illustrated in FIGS. 9-11. In the preferred embodiment the connector mechanism 76 is a rigid, rotatable collar which telescopically couples the inner body 60 to the outer body 44 so that the length of the inner member 60 extending out of the mouth of the end section 54 of the outer body 44 can be adjusted by rotating the connector mechanism 76.

The connector mechanism 76 includes a semicircular yoke 78 having two side surfaces spaced by an outer semicircular surface 80 and an inner semicircular surface. The inner semicircular surface includes a semicircular threaded edge 82 and a semicircular edge 84 radially offset from the edge 82 by a radially extending interior side wall 86 whereby the edge 82 has a shorter radius than the edge 84. Each of the edges 82, 84 extends substantially axially in parallel, coaxial relationship to each other.

The connector 76 includes another yoke 88 having a semicircular shape and having offset semicircular, axially extending edges 90, 92, which separate two side surfaces of the yoke 88. The yoke 88 has an exterior semicircular surface 94. The edge 90 is threaded and has a shorter radius than does the edge 92.

The yokes 78, 88 are connected by a suitable securing means so that the edges 82, 90 are aligned to define a threaded portion providing an engagement surface for engaging the thread 74 of the inner body 60 and further so that the edges 84, 92 are aligned to define a clamp portion providing an engagement surface for engaging the outer body 44. In the illustrated preferred embodiment, this securing means comprises a hinge which includes two tabs 96, 98 extending outwardly from the outer surface 80 of the yoke 78 and which further includes a tab 100 and another similarly disposed but spaced tab (not shown) similar to the tab 98. The tab 100 and its related tab extend outwardly from the exterior surface 94 of the yoke 88. The tabs have apertures defined therethrough for receiving respective pins 102, 104 for pivotally retaining a linkage member 106 to the tabs. The linkage member 106 of the preferred embodiment is an elongate piece having holes defined through the ends thereof through which the pins 102, 104 pass when the linkage member 106 is retained between the tabs extending from the yokes 78, 88. This hinge mechanism permits the yokes 78, 88 to be pivoted between an open position and a closed position.

In the closed position, the yokes 78, 88 have various degrees or states of retention dependent upon how tightly the yokes 78, 88 are closed together. These states of retention are dependent upon a closure means which includes in the preferred embodiment a lug 108 extending outwardly from the outer surface 80 of the yoke 78, another lug 110 extending outwardly from the outer surface 94 of the yoke 88, and suitable fastener means for fastening the lugs 108, 110 together. In the preferred embodiment, the fastener means includes a bolt 112 and a nut 114. The bolt 112 passes through apertures defined in the lugs 108, 110. One state of retention is established by tightening the nut 114 onto the bolt 112 passing through the lugs 108, 110 sufficiently to cause the aligned edges 84, 92 to engage the outer body 44 adjacent the continuous lip 56, but not so tightly as to prevent relative rotational movement between the aligned threaded edges 82, 90 and the thread 74 of the inner body 60. When in this state of retention, the connector mechanism 76 can be rotated so that the engaged threads of the edges 82, 90 and the thread 74 extend or retract, depending upon the direction of rotation, the inner body 60 relative to the outer body 44.

When the inner body 60 has been properly positioned relative to the outer body 44 by the aforementioned rotative movement between the connector mechanism 76 and the inner body 60, another state of retention is entered by further tightening the nut 114 onto the bolt 112 so that the clamping edges 84, 92 fixedly grip the outer body 44 and the threaded edges 82, 90 firmly grip the threaded outer surface of the inner body 60. Such firm gripping action is obtained in the preferred embodiment by making the connector mechanism 76 in one piece with the edges 82, 90 defining a diameter equal to the outer diameter of the screw thread 74 and the edges 84, 92 defining a diameter equal to the outer diameter of the outer body 44, and by then cutting the single piece construction in half whereby the width of the cut reduces the original diameters to be less than the respective diameters of the inner body 60 and the outer body 44.

An alternative to the aforementioned connector mechanism 76 is to connect a rotatable ring having a complemental thread on its interior for engaging the thread 74 of the inner body 60 when the ring is connected to the outer body by means of a suitable clamp, such as a Victaulic clamp.

The adjustable length manifold assembly 10 still further includes retainer means for preventing the inner body 60 from being fully withdrawn from the outer body 44 when the connector mechanism 76 is disconnected from the inner and outer bodies. The retainer means of the illustrated preferred embodiment includes a sleeve which is inserted into the hollow interior region between the side walls of the inner and outer bodies when the inner body is disposed in the hollow interior region of the outer body. The retainer means also includes a suitable means for attaching the sleeve to the outer body 44. The sleeve of the preferred embodiment is identified in FIG. 12 by the reference numeral 116. The sleeve 116 is split into two halves so that it can be easily placed around the inner body 60 as it is inserted into the outer body 44. Each of the portions of the sleeve has an inner axial wall 118, an outer axial wall 120, and an intermediate radial wall 122 connecting the outer wall 120 to the inner wall 118 in a J-shaped configuration because the inner wall 118 is longer than the outer wall 120. This type of construction defines a channel bounded by the facing surfaces of the inner wall 118 and the outer wall 120 and the connecting inner surface of the wall 122.

When properly positioned on the outer body 44, the inner wall 118 extends into the hollow interior region of the outer body 44 and lies adjacent the inner surface of the outer body 44. The continuous lip 56 is received in the channel of the sleeve 116. The outer wall 120 has a plurality of threaded holes defined therein so that they overlie the groove 58 in the lip 56 when the lip 56 is received in the channel. In the preferred embodiment the holes receive suitable set screws 124 which are threaded through the openings into engagement with the groove 58 of the lip 56. The screws 124 form part of the attachment means of the retainer means of the illustrated preferred embodiment. When properly positioned, one portion of the split sleeve receives half the lip 56 and the other portion of the split sleeve receives the other half of the lip 56.

When the sleeve 116 is properly retained on the outer body 44, the inner wall 118 extends into the hollow interior region of the outer body 44 so that its leading edge opposite the edge connected by the wall 122 can engage the annular edge 70 of the flanged rim end 62 of the inner body 60. This engagement prevents the inner body 60 from being fully extracted from the outer body 44 when the retainer means is suitably secured to the groove 58 even though the connector mechanism 76 is removed from the assembly. This engagement also maintains the inner and outer bodies in a coaxial relationship to reduce or avoid abrasion between the two bodies.

The adjustable length manifold assemblies 40, 42 shown in FIG. 2 have a similar general design and operation to the adjustable length manifold assembly 10 although the assemblies 40, 42 have different shapes and sizes. It is also to be noted that the adjustable length manifold assemblies can have various connecting structures associated therewith, such as rigid elbow joints or rotative ball joints.

FIG. 4 shows the adjustable length manifold assembly 10 connected at both ends to other conduits. These conduits include valves 126, 128 of types as known to the art for bleeding or draining fluid from the flow line. Such bleed valves are used to prevent excessive cooling or solid formation within the flow line.

FIG. 4 also illustrates in schematic form couplings between the hubs of the ends 46, 66 of the adjustable length manifold assembly 10. These representations are identified by the reference numerals 130, 132. Similar connections are made between ordinary sections of pipe such as at the junction identified by the reference numeral 134 in FIG. 4. These types of connections are made throughout the entire system depicted in FIGS. 1A-2, although they may be of varying sizes. One of these connections is more particularly shown in FIG. 5.

FIG. 5 shows the connection 132 between the end 66 of the inner member 60 and a similarly constructed hub at the end of another conduit section such as an elbow joint 136 shown in FIG. 4.

The hub of the end portion 66 has an outwardly extending beveled surface 138 which has an obtuse included angle relative to the main side wall portion of the inner body 60. The beveled surface 138 terminates at its radially outer end in a flat, circumferential shoulder portion 140 which extends axially. The shoulder portion 140 terminates in a groove portion 142 which separates the shoulder portion 140 from another axially extending flat, circumferential shoulder portion 144. Another beveled portion 146 extends farther outwardly from the shoulder portion 144 to still another axially extending flat, circumferential shoulder portion 148. The shoulder portions 140, 144 are axially aligned with equal radii or diameters whereas the shoulder portion 148 has a greater radius and diameter than either of the other shoulder portions 140, 144. On the interior of the hub of the end 66 there is an indentation 149 defined by an inner surface of the hub having a greater diameter than the inner diameter of the main portion of the inner body 60. The hub of the elbow joint 136 has a similar construction.

Received within the indentations of the two hubs is a seal ring 150 having an inner diameter equal to the principal inner diameter of the fluid passageways defined through the inner body 60 and the elbow joint 136. The seal ring 150 includes O-rings or other suitable sealing members 152, 154 for providing fluidtight seals with the respective hubs. The seal ring 150 has an external rib 156 defined thereon for preventing the two hubs from making direct contact at their facing end surfaces. This provides a gap which can be used to pry the hubs apart when they are tightly engaged with the interior seal ring 150. Clamping the two hubs together with the seal ring 150 disposed therebetween is a suitable clamp mechanism 158.

The foregoing construction is generally known to the art except for the additional element of the farthest outwardly protruding beveled portion 146 and shoulder portion 148. Under normal operation, the clamp mechanism 158 engages the shoulder portion 144 and the groove 142 of each of the hubs. However, this part of the hub can become worn so that slippage can result. With prior devices there was nothing to impede such slippage because the shoulder 144 was the terminating structure of the hub. However, in the present invention, the outwardly protruding beveled portion 146 and shoulder portion 148 are present to engage the inner surface of the clamp mechanism 158 should the shoulder portion 144 fail.

A further distinction is that the clamp mechanism 158 is an oversized clamp compared to the size of clamp that would be used with the prior types of hubs that did not include the last shoulder portion 148. For example, if the hub were a three-inch hub, then a four-inch clamp would be used, and if the hub were a six-inch hub, an eight-inch clamp would be used.

Referring now to FIG. 6, the preferred embodiment of the gathering manifold 14 will be described.

The gathering manifold 14 includes an elongated section of rigid pipe 160 made up of a plurality of straight segments 162 and T-shaped segments 164 butt-welded together such as illustrated by the seams shown in FIG. 6. The rigid pipe 160 is supported near the ground by suitable support brackets such as identified by the reference numerals 166, 168 in FIG. 6. The ends of the pipe 160 terminate in hubs of the type described hereinabove with reference to FIG. 5. One of the hubs is closed and the other of the hubs is connected by rigid pipe to the vapor separator unit 16, and they are hooked together to form a continuous line with the required number of inlets.

Welded to the T-sections 164 are input ports or inlet necks, each of which includes straight sections of pipe 170 connected in line with a manually actuated ball valve 172 of a suitable type as known to the art. Also disposed in line with the rigid sections 170 and the valve 172 is a rupture disk 174 (or other suitable type of overpressure protection device) contained in a rupture disk housing 176. The rupture disk 174 is of a suitable type as known to the art. The inlet neck terminates in a hub 178 of a type as previously described. In the preferred embodiment the hub 178 is connected by a rigid pipe to the hub of the inner body 60 or outer body 44 (depending upon the orientation) of the adjustable length manifold assembly 10. This rigid connection is shown by the pipe 12 in FIG. 1A. In the preferred embodiment, the gathering manifold 14 includes a plurality of the inlet necks for accommodating a plurality of the adjustable length manifold assemblies 10 which will extend from the outlets of the plurality of receivers 2 when more than one receiver 2 is needed at a well site.

The valve 172 is disposed in the inlet neck so that if a leak occurs in the line between the receiver 2 and the common conduit provided by the pipe 160, the valve 172 can be manually actuated to shut down that one line without shutting down the entire fracturing fluid flow into the well if there are other flows coming into the pipe 160 through other inlet ports.

The rupture disk 174 is provided as a safety mechanism in case the pressure in the line into the respective neck exceeds the pressure rating of the rupture disk.

In the preferred embodiment, the gathering manifold 14 is placed near the ground at a height which is below the heights of the outlets 8 of the receivers 2. In the preferred embodiment, the inlet necks extend laterally or substantially horizontally to the ground from the pipe 160 for coupling with the rigid pipe 12 at a height approximately equal to the height at which the pipe 160 is spaced above the ground. Because this creates a possible liquid collection point which could cause excessive chilling or ice plug formation, a bleed valve similar to the valves 126, 128 shown in FIG. 4 is disposed at this low height in each of the lines from the receivers 2 to the gathering manifold 14. One of these bleed valves is identified in FIG. 1A by the reference numeral 180.

Figure 7:
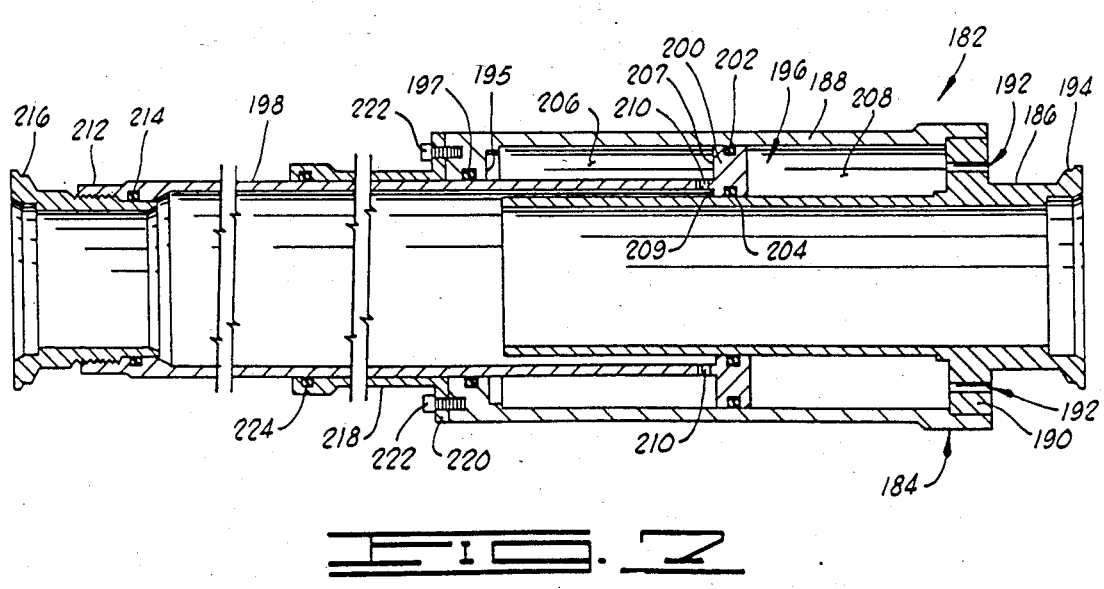
FIG. 7 is a sectional view of the preferred embodiment longitudinal adjustment means of the present invention.

With reference to FIGS. 7 and 8, the dynamic coupling means 34 identified in FIG. 1B will be more particularly described. Broadly, the connector mechanism provided by the dynamic coupling means 34 comprises a longitudinal adjustment means for permitting longitudinal movement in the system between two or more objects. The dynamic coupling assembly also includes lateral or transverse adjustment means for permitting lateral movement or movement transverse to the longitudinal movement permitted by the longitudinal adjustment means between the objects in the system. The longitudinal movement and the transverse or lateral movement can occur under dynamic operating conditions wherein there is relative movement between the connected objects such as when fluid is flowing through the dynamic coupling assembly 34.

The longitudinal adjustment means, generally identified by the reference numeral 182, is shown in its preferred embodiment in FIG. 7. The longitudinal adjustment means 182 is made of rigid components, such as steel pipe in the preferred embodiment. As shown in FIG. 7, the longitudinal adjustment means 182 is comprised of five separable parts.

Two of the parts define a rigid housing 184 comprising an inner member 186 and an outer member 188. The inner member 186 is a cylindrical pipe through which a hollow passageway is defined by the wall of the pipe. Extending radially outwardly from the wall of the pipe is a threaded flange 190 through which a plurality of longitudinal or axial openings or apertures 192 are defined. Moisture filters (not shown) can be used with the openings 192 as would be known to the art. Formed on the end of the inner member 186 near to which the flange 190 is disposed is a connector hub for connecting the longitudinal adjustment means into the system of the present invention.

The outer member 188 of the rigid housing 184 is, in the preferred embodiment, a cylindrical pipe having a threaded end which engages the threads of the flange 190 of the inner member 186. The member 188 has a longitudinally extending rigid side wall defining a hollow interior region with a diameter greater than the outer diameter of the side wall of the inner member 186. The side wall of the outer member 188 extends parallel to the side wall of the inner member 186 so that an annular space 196 is defined between the inner and outer members. The end of the outer member 188 opposite the threaded end has an inwardly extending circumferential lip 195 in which a sealing member 197 is disposed. In the preferred embodiment, the sealing member 197 is a U-packing seal of a type as known to the art.

A third part of the longitudinal adjustment means 182 is a rigid piston member defined in the preferred embodiment by a middle or intermediate cylindrical pipe 198. The pipe 198 has a head portion 200 which, in the preferred embodiment, has an annular shape for being slidingly received in the annular space 196. Associated with the head portion 200 are sealing members 202, 204 which are U-packing seals in the preferred embodiment. The seals 202, 204 fluid-tightly engage the inner surface of the outer member 188 and the outer surface of the inner member 186, respectively. When the intermediate member 198 is associated with the rigid housing 184 so that the radially extending rim provided by the annular piston head portion 200 is received in the space 196, the space 196 is divided thereby into annular cavities 206, 208 which have variable volumes depending upon where the head portion 200 is disposed along the length of the overall annular space 196 defined between the inner and outer members of the rigid housing 184.

The head portion 200 has an outer surface with which the seal member 202 is associated and an inner surface with which the seal 204 is associated. These two surfaces are separated by side surfaces, which side surfaces define parts of the portions of the cavity 196. Extending from the side surface defining a movable boundary of the cavity portion 206 is the principal side wall of the intermediate member 198. The side wall is spaced from the inner and outer surfaces of the head portion 200 so that the cavity portion 206 is further divided into inner and outer regions. These two regions are in fluid or pressure communication through one or more apertures 210 formed radially through the side wall near the junction of the side wall with the head portion 200. At this junction between the side wall and the head portion there are two interior faces 207, 209 defined thereby which comprise the side surface of the head portion 200 defining the movable boundary of the cavity portion 206. Any pressure within the fluid passageways defined through the longitudinal adjustment means 182 is exerted on these faces.

The side wall of the intermediate member 198 extends longitudinally from the head portion 200 in parallel relationship with the side walls of the inner and outer members 186, 188. The side wall of the member 198 terminates at an interiorly threaded end 212 having an O-ring 214 or other suitable sealing member associated therewith. This side wall of the member 198 defines a piston wall portion of the intermediate member. The end 212 has a threaded hub 216, which is another part of the longitudinal adjustment means 182, connected thereto as shown in FIG. 7.

The last element of the longitudinal adjustment means 182 is a sleeve member 218 having an outwardly flanged end 220 which is connected by screws 222 to the inwardly lipped end 195 of the outer member 188. The inner diameter of the sleeve member 218 is approximately the same as the outer diameter of the side wall of the intermediate member 198 to provide a protective, supportive cover to the side wall of the intermediate member 198. Engaging the outer surface of the side wall of the intermediate member 198 is a rod wiper element 224 disposed in the end of the sleeve member 218 opposite the flanged end 220.

When the hub 194 and the hub 216 are connected within the system of the present invention, the intermediate member 198 can move longitudinally relative to the rigid housing 184 to accommodate corresponding longitudinal movement between the objects to which the longitudinal adjustment means 182 is connected. When such movement occurs, no pressure pulses are generated within the longitudinal adjustment means 182 because the internal volume of the means 182 remains approximately constant regardless of the length of the longitudinal adjustment means 182 as a result of the offsetting changes in the volume of the outer region of the cavity portion 206; however, there are frictional forces present due to the sealing members. Furthermore, pressure fluctuations within the fluid passageway of the longitudinal adjustment means 182 do not create net forces which tend to extend to contract the longitudinal adjustment means 182 because the pressure acting on the intermediate member 198 in a direction tending to extend it are offset by the pressure acting on the faces 207, 209 of the head portion 200 in a direction tending to contract the intermediate member 198.

The dynamic coupling means 34 also includes the transverse or lateral adjustment means which is generally identified by the reference numeral 226, the preferred embodiment of which is shown in FIG. 8. In the preferred embodiment, the transverse adjustment means 226 includes at least two ball and socket joint means connected in series with the longitudinal adjustment means 182. The ball and socket joint means has a standard construction including a ball half 228 received in a socket half 230 and held together by a ball retainer 232 and a retaining collar 234 which is threadedly connected to the socket half 230 and secured therewith by means of one or more retaining screws 236. An O-ring or U-packing member 238 or other suitable sealing member forms a fluid-tight seal between the ball half 228 and the socket half 230. Defined through the ball half 228 and the socket half 230 is a fluid passageway.

In the preferred embodiment of the inventive system as disclosed in part in FIG. 1B, there are two ball joints connected one at each end of the longitudinal adjustment means 182. Both of these are identified in FIG. 1B by the reference numeral 226. With these two elements of the transverse adjustment means connected in series with the longitudinal adjustment means 182 between the distribution manifold 24 and the pump 30, transverse movement along any axis can be accommodated so that an automatically adjustable linkage is provided when the pump 30 moves transversely relative to the distribution manifold 24 and the other stationary portions of the inventive system.

With reference again generally to FIGS. 1A–2, the operation of the present invention will be described. Initially, the receiver 4, the gathering manifold 14, the vapor separator unit 16, the pressure booster unit 20, the distribution manifold 24, and the pump 30 are located on the ground at the well site where they are to rest within the system. With these elements so positioned, the distances between them are defined so that the adjustable length manifold assemblies 10 of the present invention can be used. For example, the outlet 8 of the receiver 2 is connected to an inlet neck of the gathering manifold 14 by means of one adjustable length manifold assembly 10. This connection is made, for example, by connecting the hub portion 46 of the adjustable length manifold assembly to the gathering manifold 14 by means of the pipe 12 and then manually extracting or inserting the inner member 60 for connection at the outlet 8 of the receiver 2. With this gross distance compensation having been made, the connector mechanism 76 is then opened and placed around the inner and outer members 44, 60 of the adjustable length manifold assembly 10. The connector 76 is closed to the first state of retention so that it can be rotated to "fine-tune" the length of the connection between the outlet 8 and the gathering manifold 14. Once this fine-tuning is completed, the connector 76 is placed in its second state of retention thereby clamping the inner and outer members relative to each other to provide a rigid connection between the outlet 8 and the gathering manifold 14.

The distribution manifold 24 is connected to the pump 30 with the dynamic coupling means as shown in FIG. 1B. With the longitudinal adjustment means and the transverse adjustment means connected in series between the distribution manifold 24 and the pump 30, and the other elements of the system having been connected together by suitable rigid pipe connections including various adjustable length manifold assemblies as needed, the system is ready to be operated by closing the bleed valves (exemplified in FIGS. 1A and 2 by the element 180) in the lines between the outlets 8 and the gathering manifold 14, by opening the ball valves 172 in the gathering manifold inlet necks to which receivers 2 have been connected, and by starting the pump 30 to cause the carbon dioxide contained in the receivers 2 to flow into the well at the well site. With the pump 30 operating, it vibrates in various directions so that the relative distance between the distribution manifold 24 and the pump 30 changes. These distance changes are compensated for by the dynamic coupling means 34.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims.

What is claimed is:

1. An adjustable length manifold assembly, comprising:
   a rigid outer body having a bore defining a first hollow interior region;
   a rigid inner body having an outer wall defining a second hollow interior region for communicating with said first hollow interior region, said outer wall having a first thread defined thereon; and
   connector means for connecting said inner body with said outer body so that said inner body is rigidly held in a selectable position relative to said outer body, said connector means having an interior semicircular surface portion with a second thread defined thereon for engaging with said first thread of said inner body and said connector means being rotatable, in a first state of retention on said body, relative to said inner body for adjusting the relative positions of said inner and outer bodies and said connector means being fixed, in a second state of retention on said outer body, relative to said inner body, said connector means including:
   a first yoke having a first semicircular surface and a second semicircular surface offset from said first semicircular surface;
   a second yoke having a third semicircular surface and a fourth semicircular surface offset from said third semicircular surface;
   hinge means for pivotally connecting said first and second yokes so that said first and third semicircular surfaces are aligned, thereby defining a first semicircular engagement surface for engaging a first portion of said outer wall of inner body, and so that said second and fourth semicircular surfaces are aligned, thereby defining a second semicircular engagement surface for engaging a second portion of said outer body; and
   closure means for closing said first and second yokes to a selectable one of said first and second states of retention.

2. The adjustable length manifold assembly of claim 1, wherein:
   the second portion of said outer body including a hub at one end thereof;
   said first semicircular engagement surface includes said second thread and engages the first portion of said outer wall of said inner body in response to said closure means; and
   said second semicircular engagement surface engages said hub in response to said closure means.

3. The adjustable length manifold assembly of claim 2, further comprising retainer means for preventing said inner body from being fully withdrawn from said outer body when said connector means is disconnected from said inner and outer bodies, said retainer means including:
   sleeve means for being inserted into said first hollow interior region between said bore and said outer wall when said inner body is disposed in said first hollow interior region; and
   means for attaching said sleeve means to said outer body.

4. The adjustable length manifold assembly of claim 1, further comprising retainer means for preventing said inner body from being fully withdrawn from said outer body when said connector means is disconnected from said inner and outer bodies, said retainer means including:
   sleeve means for being inserted into said first hollow interior region between said bore and said outer wall when said inner body is disposed in said first hollow interior region; and
   means for attaching said sleeve means to said outer body.

5. The adjustable length manifold assembly of claim 1, further comprising retainer means for preventing said inner body from being fully withdrawn from said outer body when said connector means is disconnected from said inner and outer bodies, said retainer means including:
   sleeve means for being inserted into said first hollow interior region between said bore and said outer wall when said inner body is disposed in said first hollow interior region; and
   means for attaching said sleeve means to said outer body.

6. A rigid adjustable length assembly for providing variable length connections between elements of a pressurized fluid flow system at a well site, said assembly comprising:
   a first rigid pipe having a circumferential lip adjacent one end of said first rigid pipe;
   a second rigid pipe having a first end and a second end disposable in said first rigid pipe through said one end and further having a continuous thread defined on at least a portion of the main body of said second rigid pipe between said first and second ends; and
   a collar having a clamp portion for engaging said first rigid pipe adjacent said one end and having a threaded portion for engaging said thread of said second rigid pipe, said collar including:
   first semicircular yoke having a first semicircular, threaded surface and having a second semicircular surface radially offset from said first threaded surface;
   a second semicircular yoke having a third semicircular threaded surface and a fourth semicircular surface radially offset from said third threaded surface; and
   securing means for securing said first yoke to said second yoke so that said first and third threaded surfaces are aligned to define said threaded portion and so that said second and fourth surfaces are aligned to define said clamp portion.

7. The rigid adjustable length assembly of claim 6, wherein said securing means includes:
a first tab extending from said first yoke;
a second tab extending from said second yoke;
a linkage member pivotally connected to said first tab and pivotally connected to said second tab;
a first lug extending from said first yoke;
a second lug extending from said second yoke; and
fastener means for fastening said first and second lugs together.

8. The rigid adjustable length assembly of claim 6, wherein:
said lip of said first rigid pipe has a circumferential groove defined therein;
said assembly further comprises:
a split sleeve having two portions, each of said portions having an inner wall, an outer wall and a radial wall connecting said outer wall to said inner wall so that a channel is defined by said inner, outer and radial walls, a first one of said two portions being disposed adjacent said first rigid pipe so that half of said lip is received in said channel of said first portion with said inner wall thereof extending into said first rigid pipe and a second one of said two portions being disposed adjacent said first rigid pipe so that the other half of said lip is received in said channel of said second portion with said inner wall thereof extending into said first rigid pipe; and
means for attaching said split sleeve to said lip; and
said second rigid pipe has a flanged rim defined therein at said second end, said flanged rim having an edge for engaging said inner walls of said two portions of said split sleeve.

9. The rigid adjustable length assembly of claim 8, wherein said collar includes:
a first semicircular yoke having a first semicircular, threaded surface and having a second semicircular, surface radially offset from said first threaded surface;
a second semicircular yoke having a third semicircular, threaded surface and a fourth semicircular, surface radially offset from said third threaded surface; and
securing means for securing said first yoke to said second yoke so that said first and third threaded surfaces are aligned to define said threaded portion and so that said second and fourth surfaces are aligned to define said clamp portion.

10. The rigid adjustable length assembly of claim 9, further comprising a fluid sealing member mounted on said flanged rim of said second rigid pipe for fluid-tightly engaging with said first rigid pipe.

11. The rigid adjustable length assembly of claim 10, wherein said securing means includes:
a first tab extending from said first yoke;
a second tab extending from said second yoke;
a linkage member pivotally connected to said first tab and pivotally connected to said second tab;
a first lug extending from said first yoke;
a second lug extending from said second yoke; and
fastener means for fastening said first and second lugs together.

12. The rigid adjustable length assembly of claim 11, wherein said first end of said second rigid pipe includes a hub having a first circumferential shoulder portion, a second circumferential shoulder portion, a groove defined between said first and second shoulder portions, and a third circumferential shoulder portion having a larger outer diameter than said first or second shoulder portions.

13. The rigid adjustable length assembly of claim 6, wherein said first end of said second rigid pipe includes a hub having a first circumferential shoulder portion, a second circumferential shoulder portion, a groove defined between said first and second shoulder portions, and a third circumferential shoulder portion having a larger outer diameter than said first or second shoulder portions.

* * * * *